United States Patent Office 3,297,795
Patented Jan. 10, 1967

3,297,795
STABILIZATION OF MONOOLEFIN POLYMERS WITH CARBODIIMIDES
Julius Peter, Odenthal, Bezirk Cologne, and Wolfram Neumann, Leverkusen, Germany, assignors to Farbenfabriken Bayer Aktiengesellschaft, Leverkusen, Germany, a German corporation
No Drawing. Filed July 23, 1963, Ser. No. 296,934
Claims priority, application Germany, July 26, 1962, F 37.426
10 Claims. (Cl. 260—897)

This invention relates to the stabilization of polymers obtained mainly from aliphatic monoolefins and copolymers with minor amounts of other polymerizable compounds, and more particularly to cross-linked polymers thereof.

Polymers and copolymers of monoolefinic compounds, even when cross-linked, are attacked by oxygen, heat, light, moisture, weather, etc., to varying extents, depending upon their chemical structure. Numerous compounds have been described for the stabilization of the non-cross-linked polymers, e.g. condensed phenols and sulfur-containing compounds such as thiophenols or thiocarboxylic acid esters, but these known classes of compounds are unsuitable or only partially suitable for stabilizing cross-linked polymers. This is because these compounds, acting as radical acceptors, noticeably disturb the radical induced cross-linking (e.g. by peroxides) and, in the extreme case, they completely inhibit this cross-linking. The stabilizing action of these compounds, e.g. particularly against the action of heat, shows that many improvements are desirable. This has been described, for example by L. O. Amberg (Lecture at the 4th Rubber Technology Conference, London, 1962, subsequently published in proceedings of the 4th Rubber Technology Conference, London, 1962) in respect of the cross-linked copolymers of ethylene-propylene.

It is therefore an object of this invention to provide stabilizers for polymers and copolymers of mainly monoolefine compounds, especially when cross-linked. A further object is to provide mixtures of said olefinic polymers which contain stabilizers against the influence of oxygen, heat, light, moisture, weather, etc., and wherein said polymers shall be cross-linked. Still more objects will appear hereinafter.

It has now been found that the aforementioned objects and others are accomplished in accordance with the present invention and that an excellent stabilization, more especially of cross-linked homopolymers and copolymers based exclusively or mainly on aliphatic monoolefinic compounds containing no ester groups, can be produced by incorporating carbodiimides into them.

The carbodiimides used according to the invention are, quite generally, aliphatic, araliphatic and aromatic mono- and polycarbodiimides.

The following are as examples of suitable monocarbodiimides:

N,N'-diisopropylcarbodiimide,
N,N'-dibutylcarbodiimide,
N,N'-diallylcarbodiimide,
N,N'-dioctylcarbodiimide,
N,N'-dicyclopentylcarbodiimide,
N,N'-dicyclohexylcarbodiimide,
N,N-dicycloheptylcarbodiimide,
N,N'-dicyclooctylcarbodiimide,
N,N'-dibornylcarbodiimide,
diphenylcarbodiimide,
di-p-tolylcarbodiimide,
di-p-bromophenylcarbodiimide,
di-p-carbethoxyphenylcarbodiimide,
di-p-diethylaminophenylcarbodiimide,
di-α-naphthylcarbodiimide,
di-β-naphthylcarbodiimide,
di-α-pyridylcarbodiimide,
N-methyl-N'-tert.-butylcarbodiimide,
N-hexyl-N'-isopropylcarbodiimide,
N-allyl-N'-oleylcarbodiimide,
N-allyl-N'-cyclohexylcarbodiimide,
N-tert.-butyl-N'-cyclohexylcarbodiimide,
N-tert.-butyl-N'-furfurylcarbodiimide,
N-propyl-N'-phenylcarbodiimide,
N-isopropyl-N'-3-chlorophenylcarbodiimide,
N-phenyl-N'-benzylcarbodiimide,
N-isopropyl-N'-naphthylcarbodiimide,
N-phenyl-N'-p-tolylcarbodiimide,
N-phenyl-N'-tritylcarbodiimide.

Furthermore, derivatives of diphenyl carbodiimide which are substituted on the aromatic radicals have proved to be effective, which derivatives can for example be prepared according to French patent specification 1,293,252 from aromatic monoisocyanates, which carry one or two aryl-, alkyl-, aralkyl-, or alkoxy-substituents in the o-position to the NCO-group, at least one of the substituents comprising at least two carbon atoms, under the action of for example tertiary amines or basically reacting metal compounds. Such carbodiimides are for example the 2,2',6,6'-tetraethyl-diphenyl-carbodiimide,
2,2'-diisopropyl-diphenylcarbodiimide,
2,2'-diethoxy-diphenylcarbodiimide,
2,2',6,6'-tetraethyl-diphenyl-carbodiimide,
2,2',6,6'-tetraisopropyl-diphenyl-carbodiimide,
2,2',6,6'-tetra-sec.-butyl-diphenyl-carbodiimide,
2,2',6,6'-tetraethyl-3,3'-dichloro-diphenylcarbodiimide.

Polycarbodiimides such as tetramethylene-ω,ω'-bis-t-butylcarbodiimide, hexamethylene-ω,ω'-bis-t-butylcarbodiimide or hexamethylene-ω,ω'-bis-cyclohexyl-carbodiimide are also suitable, and for example the polycarbodiimides described in U.S. patent specification 2,941,966. Particularly effective stabilizers are those polycarbodiimides which can be produced from aromatic diisocyanates and polyisocyanates, such as polycarbodiimides of 1,3-diisopropyl-phenylene-2,4-diisocyanate,
1-methyl-3,5-diethyl-phenylene-2,4-isocyanate,
1,3,5-triethylbenzene-2,4-diisocyanate,
1,3,5-triisopropyl-benzene-2,4-diisocyanate,
3,5,3',5'-tetraethyl-diphenyl-methane-4,4'-diisocyanate or
3,5,3',5'-tetraisopropyl-diphenyl-methane-4,4'-diisocyanate.

It is obvious that mixtures of carbodiimides can also be used.

It is particularly advantageous to use those carbodiimides which can be characterized by the following formula:

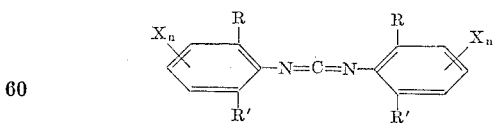

or in the case of the polycarbodiimides of the formula $$Z\text{-}[Y\text{---}N\text{==}C\text{==}N\text{]}_m Z$$

in which R stands for like or different alkyl-, alkoxy-, aryl-radicals, more especially lower alkyl groups such as methyl, ethyl, propyl, isopropyl, butyl, isobutyl, R' can stand for R or additionally halogen, such as chlorine or bromine or nitro-radicals. X can stand for any desired inert radical, such as the above R or R', or nitrilo-, carbmethoxy-, carbethoxy-, dialkylamino-groups or the like and *n* for an integer from 0 to 3, and *m* an integer greater than 2. Y represents a hydrocarbon radical which may be substituted and which may contain hetero atoms such as N, especially alkyl groups containing 2–20 carbon atoms, cyclohexyl- or phenylene groups which might contain 1 to 3 groups such as the aforementioned R and R', Z represents an inert radical.

The polymers to be stabilized can contain the carbodiimides in quantities of, for example 0.05 to 20% by weight, advantageously 2 to 5% by weight. The carbodiimides can be added during or after polymerization.

The homopolymers and copolymers of aliphatic monoolefines such as ethylene, propylene, butylene, isobutylene and other alkyl-substituted ethylenes, are examples of the polymers which can be stabilized. Examples of this series are, more especially, polyethylene, propylene and ethylene-propylene copolymers. Other compounds are terpolymers of said aliphatic monoolefins such as the terpolymers of ethylene and propylene with small quantities of doubly ethylenically-unsaturated compounds of which the double bonds show different reactivity, such as dicyclopentadiene or 11-methyl dodecadiene. Further examples are copolymers of said aliphatic monoolefines, such as ethylene or propylene, with vinyl ethers, acrylonitrile as well as chlorinated, fluorinated and sulfochlorinated ethylene and ethylene copolymers.

The cross-linking of such products can, for example, be effected by heating the reaction components with radical-forming substances, especially peroxides. Stable peroxides from the dialkyl and diaryl series, such as dicumyl peroxide or 2,5-dimethyl-2,5-di-t-butyl peroxyhexane, are best for this purpose. Substances from the diacyl series, such as dibenzoyl peroxide or dichlorobenzoyl peroxide, are also suitable. Because of their more rapid reactivity, these latter compounds are mainly introduced in the processing from solution in organic solvents.

Another way of cross-linking which likewise proceeds by way of radical mechanism is that using high-energy radiation, such as can originate, for example, from a Van de Graff generator or from a cobalt 60 source. The cross-linking can, for example, be effected by means of sulfur.

As well as the stabilizers mentioned, the conventional fillers such as activated and inactive carbon black, light active fillers based on colloidal silica or colloidal calcium silicate and inactive filler such as chalk, kaolin or heavy spar can be added to the polymers. Moreover, there can be added to the mixture the conventional plasticizers such as mineral oil plasticizers or synthetic plasticizers of the phthalate or phosphate type, depending upon compatibility with the existing polymer. Other additives are, for example, dyestuffs with an organic or inorganic base. The incorporation of the added substances can be effected on the mixing units usual in the rubber and plastics industries, such as roll stands, internal mixers, kneaders or kneading worms. It is also possible to add the stabilizers to the polymers which are to be stabilized, after polymerization and before working up.

The cross-linking is carried out by the processes usual in the high-polymer art, usually by heating in hot air or superheated steam, in a press or in hot baths of liquid.

When cross-linking by means of high-energy radiations or when using extremely highly active radical formers, cross-linking at room temperature is also possible.

The stabilizers described protect the material more especially against influences due, for example, to heat, light, oxygen, ozone, moisture, weathering or ultra-violet radiation, etc.

The stabilized materials can, for example, be used as synthetic plastics, rubber articles, foils or as raw materials for lacquers.

*Example 1*

Using an ethylene-propylene copolymer, the following mixtures were prepared on a roll stand (the amounts given are parts by weight):

|  | A | B | C | D |
|---|---|---|---|---|
| Ethylene-propylene copolymer (50% propylene) Mooney ML 4' 100° C. 45 | 100.0 | 100.0 | 100.0 | 100.0 |
| Stearic acid | 1.0 | 1.0 | 1.0 | 1.0 |
| Highly active precipitated silica | 30.0 | 30.0 | --- | --- |
| HAF-carbon black | --- | --- | 45.0 | 45.0 |
| Zinc oxide | 1.0 | 1.0 | 1.0 | 1.0 |
| Dicumyl peroxide (100%) | 4.0 | 4.0 | 4.0 | 4.0 |
| Sulfur | 0.5 | 0.5 | 0.5 | 0.5 |
| Triisopropyl benzene polycarbodiimide | --- | 4.0 | --- | 4.0 |

(See Example 2 of French patent specification 1,293,252.)

The mixtures were vulcanized in a vulcanizing press for 35 minutes at 151° C. The test sheets obtained in this way were aged at 150° C. in hot air. Before and after ageing, the following mechanical values were found:

|  | A | B | C | D |
|---|---|---|---|---|
| Tearing strength (kg./cm.²)/ elongation (percent): |  |  |  |  |
| Before ageing | 126/695 | 108/755 | 174/355 | 172/389 |
| After 1 week | 94/360 | 123/555 | 33/230 | 135/345 |
| After 2 weeks | 11/40 | 101/455 | 7/45 | 65/165 |
| After 3 weeks | Broken | 71/510 | Broken | 33/175 |
| After 4 weeks | Broken | 8/80 | Broken | 22/105 |

A practical, equally good stabilization is obtained if instead of the triisopropylbenzene polycarbodiimide there is used one of the following compounds:

N,N' - dicyclohexylcarbodiimide, 2,2' - diisopropyldiphenylcarbodiimide, 2,2',6,6' - tetraethyl - diphenylcarbodiimide, 2,2',6,6' - tetraisopropyl - diphenylcarbodiimide, tetramethylene - ω,ω' - bis - t - butylcarbodiimide, hexamethylene - ω,ω' - bis - cyclohexylcarbodiimide or the polycarbodiimides obtained from 1,3-diisopropylphenylene-2,4-diisocyanate or 1,3,5 - triethylbenzene-2,4-diisocyanate or 3,5,3',5'-tetraethyl-diphenylmethane-4,4'-diisocyanate (see e.g. French Patent 1,293,252).

*Example 2*

The following mixtures were prepared on a roll stand heated to 100° C. (The amounts given are parts by weight.)

|  | 1 | 2 |
|---|---|---|
| High pressure polyethylene | 100.0 | 100.0 |
| Stearic acid | 1.0 | 1.0 |
| Highly active silica | 30.0 | 30.0 |
| Dicumyl peroxide (active substance) | 2.0 | 2.0 |
| Triallyl cyanurate | 3.0 | 3.0 |
| Triisopropylbenzene polycarbodiimide | --- | 4.0 |

(See Example 2 of French patent specification 1,293,252.)

Sheets obtained from the mixtures were vulcanized in the vulcanizing press for 35 minutes at 151° C. (M 4.0 atm. steam pressure.) The sheets were aged in hot air at 150° C. The following changes in the mechanical properties were obtained (tearing strength in kg./cm.²/ breaking elongation in percent/hardness in Shore A):

|  | 1 | 2 |
|---|---|---|
| Unaged | 174/190/93 | 169/220/93 |
| After 1 week in hot air at 150° C | Destroyed | 161/150/94 |
| After 2 weeks in hot air at 150° C | Destroyed | 163/160/37 |
| After 3 weeks in hot air at 150° C | Destroyed | 157/30/— |
| After 4 weeks in hot air at 150° C | Destroyed | 138/75/— |

Similar equally good results are obtained with polymers obtained from isobutylene or polymers obtained from ethylene or propylene with small amounts of dicyclopentadiene or 11-methyldodecadien or with chlorinated or sulfochlorinated ethylene polymers.

We claim:

1. A stabilized monoolefin polymer composition containing as stabilizer a member selected from the group consisting of N,N'-disubstituted carbodiimide, each of said substituents being selected from the group consisting of aliphatic hydrocarbon, aromatic hydrocarbon, chlorophenyl, bromophenyl and alkoxyphenyl and polycarbodiimides of aromatic hydrocarbon diisocyanates.

2. The composition of claim 1 wherein said carbodiimide is an alkyl substituted benzene polycarbodiimide.

3. The composition of claim 1 wherein said isocyanate is an alkyl substituted diphenyl-methane diisocyanate.

4. The composition of claim 1 wherein said polymer is an ethylene polymer.

5. The composition of claim 1 wherein said polymer is an ethylene-propylene polymer.

6. The composition of claim 1 wherein said carbodiimide is an alkyl substituted diphenyl carbodiimide.

7. The composition of claim 1 wherein said carbodiimide is triisopropyl benzene polycarbodiimide.

8. The composition of claim 1 wherein said carbodiimide is 2,2'-diisopropyl diphenyl carbodiimide.

9. The composition of claim 1 wherein said carbodiimide is tetramethylene-$\omega,\omega'$-bis-t-butyl carbodiimide.

10. The composition of claim 1 wherein said carbodiimide is present in an amount from 0.05–20% by weight.

References Cited by the Examiner
UNITED STATES PATENTS
3,193,523   7/1965   Neumann et al. _____ 260—45.9

LEON J. BERCOVITZ, *Primary Examiner.*

M. J. WELSH, *Assistant Examiner.*